US011481565B2

(12) United States Patent
Fu et al.

(10) Patent No.: US 11,481,565 B2
(45) Date of Patent: Oct. 25, 2022

(54) METHOD FOR PREDICTING TAG ARRIVAL RATE OF MOBILE RFID SYSTEM

(71) Applicant: Inner Mongolia Agricultural University, Hohhot (CN)

(72) Inventors: Xueliang Fu, Hohhot (CN); Liqian Zhang, Hohhot (CN); Honghui Li, Hohhot (CN)

(73) Assignee: Inner Mongolia Agricultural University, Hohhot (CN)

( * ) Notice: Subject to any disclaimer, the term of this patent is extended or adjusted under 35 U.S.C. 154(b) by 86 days.

(21) Appl. No.: 17/014,586

(22) Filed: Sep. 8, 2020

(65) Prior Publication Data

US 2021/0182513 A1 Jun. 17, 2021

(30) Foreign Application Priority Data

Dec. 12, 2019 (CN) .......................... 201911288628.5

(51) Int. Cl.
*G06K 7/08* (2006.01)
*G06K 7/10* (2006.01)
*G06K 19/07* (2006.01)

(52) U.S. Cl.
CPC ..... *G06K 7/10376* (2013.01); *G06K 19/0723* (2013.01)

(58) Field of Classification Search
CPC ........... G06K 7/10366; G06K 7/10297; G06K 7/086; G06K 19/0723; G06F 21/602
USPC ............................... 235/451, 462.46, 472.02
See application file for complete search history.

(56) References Cited

U.S. PATENT DOCUMENTS

| 8,072,311 | B2 * | 12/2011 | Sadr | ................... G06K 7/10366 340/539.22 |
| 8,629,762 | B2 * | 1/2014 | Sadr | .......................... G01S 5/02 340/539.22 |
| 9,291,699 | B2 * | 3/2016 | Sadr | .......................... G01S 5/12 |
| 10,585,159 | B2 * | 3/2020 | Sadr | .......................... G01S 5/02 |

FOREIGN PATENT DOCUMENTS

JP          108446577      *  8/2018     ............... G06K 7/08

\* cited by examiner

*Primary Examiner* — Daniel St Cyr
(74) *Attorney, Agent, or Firm* — Thomas|Horstemeyer, LLP (57) ABSTRACT

The present invention discloses a method for predicting a tag arrival rate of a mobile Radio Frequency Identification (RFID) system. The method includes: first, establishing a dynamic tag arrival model for a mobile RFID system based on modeling data and a grey model GM(1, 1); improving a weight of an initial value of a differential equation of the grey model through weighting; and predicating a tag arrival rate based on a sliding window mechanism. A weighted grey model predication algorithm based on the sliding window mechanism can be obtained, to predicate a tag arrival rate of a mobile RFID system. The method for predicting the tag arrival rate of the mobile RFID system of the present invention can reduce a prediction error rate of the system, maintain a modeling length of 4 for the system through the sliding window mechanism, and update modeling data online.

4 Claims, 4 Drawing Sheets

```
m=4;
traindata=rawdata(1:m);        //Initialize the original data, m is the model length.
ratiomax=exp(2/(m+1));         //calculate the ratio range of train data
ratiomin=exp(-2/(m+1));
ratio=traindata(1:m-1)/traindata(2:m);
If   ratio not in range [ratiomin, ratiomax]    // if the ratio of sequence are not in range, the data
                                                //should be preprocessing
    train data prepressing;
end
return_data=wgmsw(traindata)   // calling function wgmsw() for prediction
errorrate=(train(2:m,:)-return_data(2:m,:)))./train(2:m,:);   // to calculate the relative error
average_errorrate=sum(errorrate)/(m-1);  //to calculate the average error
est_result(1:m+1,:)=return_data;   // record the prediction results
```

METHOD FOR PREDICTING TAG ARRIVAL RATE OF MOBILE RFID SYSTEM

CROSS-REFERENCE TO RELATED APPLICATIONS

This application claims priority to Chinese Patent Application No. 201911288628.5, filed Dec. 12, 2019, which is herein incorporated by reference in its entirety.

TECHNICAL FIELD

The present invention relates to the technical field of mobile Radio Frequency Identification (RFID) system tags, in particular, to a method for predicting a tag arrival rate of a mobile RFID system.

BACKGROUND

With development of the Internet of Things (IoT) technology, RFID has become one of main technologies for users to track objects. An RFID system is referred to as a static RFID system if its object with an RFID tag is stationary. Conversely, an RFID system is referred to as a mobile RFID system if its object is mobile during identification. Neither the static RFID system nor the mobile RFID system is free of an inevitable phenomenon of tag collision. After receiving an information request command sent by a reader, a tag responds to the reader with its own information. If two or more tags respond to the request of the reader, collision between tag information occurs. Consequently, the reader can identify neither of the two tags, thereby causing a significant drop in system efficiency. In the static RFID system, an unidentified tag can participate in a next round of identification. Tag collision only lengthens identification time of the system, but does not incur tag miss. However, in the mobile RFID system, if a tag has not been identified before it leaves an identification zone, tag miss occurs. This significantly reduces identification efficiency of the system. Tag miss seriously affects application of the mobile RFID system. To resolve tag collision, many researchers have proposed efficient anti-collision algorithms. These algorithms are basically classified into two categories: tree-based algorithms and ALOHA algorithms. The dynamic framed slotted ALOHA (DFSA) algorithm, a milestone among the ALOHA algorithms, has been studied by increasing researchers and incorporated into RFID standards. At present, the ALOHA algorithms focus on how to quickly and accurately identify a specific number of tags. In the tree-based algorithms such as BST and QT algorithms, an entire search space is traversed to identify a specific tag. When more tags exist, the time to identify these tags drastically grows.

In the mobile RFID system, new tags may enter the identification zone and some tags may leave the identification zone during identification. Therefore, tags are time-sensitive in the identification zone. If identification time increases, more tags leave the identification zone unidentified. Therefore, the mobile RFID system requires not only identification accuracy and efficiency, but also a low tag loss rate. The foregoing anti-collision algorithms do not take this factor into account, so they cannot be directly applied to the mobile RFID system. However, in many applications, such as logistics systems and airport baggage identification systems, a large number of tags often arrive continuously. In such cases, performance of original anti-collision algorithms for the static RFID system drop sharply. Therefore, it is necessary to study new algorithms to meet the requirements of the mobile RFID systems.

In the mobile RFID system, a number of tags in the identification zone changes over time because some tags leave the identification zone, and new tags enter the identification zone (this is referred to as arrival of new tags). If a tag leaves the identification zone before being identified, tag information is lost. This is unacceptable in many mobile RFID systems, such as smart logistics and smart airports. To reduce the tag loss rate, a priority of the reader is to know how many tags are waiting to be identified in the identification zone at a specific moment. The reader needs to adjust identification parameters based on the number of tags before starting identification. Because of tag mobility and an unknown arrival rate, a number of tags in the identification zone is unknown. As a result, the reader parameters cannot be set based on the number of tags, and identification efficiency of the system cannot be high. Therefore, how to obtain the tag arrival rate becomes the key to setting the identification parameters of the reader. The reader needs to predict a number of upcoming tags using a prediction algorithm, and then sets the parameters.

At present, many methods can be used for prediction, such as time series and neural network prediction methods. In an RFID system, due to a limited memory capacity, an RFID reader cannot record too much historical data, so a prediction algorithm needs to make predictions with a small number of samples. With limitation of a reader processing capacity, when tags arrive continuously, an arrival rate of the tags is not correlative to older data, presenting a local characteristic. Therefore, the prediction algorithm selected should be less computationally complicated and of realtimeness. In traditional prediction methods such as time series and neural network prediction methods, a number of samples significantly affects prediction accuracy, and therefore is not suitable for use in a mobile RFID system.

The grey system theory was first proposed by Professor Deng Julong, a Chinese scholar, in March 1982. Predications can be made for an uncertain system by using this grey predication approach. This approach identifies a degree of differences between development factors of a system, conducts an analysis therefore, and then processes original data to find a change pattern of the system. On a basis of the change pattern, only a small number of samples (a minimum of four samples are needed) can be used to predict a value of samples at a next moment. Grey time-series predication is to construct a grey predication model by using an observed time series reflecting characteristics of a forecast object, to predict a characteristic quantity for a specific moment in the future. At present, the grey prediction model is widely used in various small sample-based predictions, such as power loss prediction in the power industry and prediction of water quality of rivers and lakes in the hydrological industry. In the mobile RFID system, the tag arrival rate is also based on a small sample, so the grey model can be applied for such prediction.

In the grey model GM (1, 1), the first parameter 1 indicates that a grey process can be described by a first-order differential equation, and the second parameter 1 indicates that there is only one variable in a system. The system requires a minimum of four samples for prediction, that is, a modeling length is 4. In the mobile RFID system, the tag arrival rate serves as a variable. This meets the univariate requirement of the grey model GM (1, 1). However, prediction accuracy of the GM (1, 1) model decreases in a case of a sudden change in the tag arrival rate.

SUMMARY

In view of the foregoing problems, the present invention provides a method for predicting a tag arrival rate of a mobile RFID system, to offer a low prediction error rate, low computational complexity, and high system stability.

To achieve the above purpose, the present invention provides the following technical solutions:

A method for predicting a tag arrival rate of a mobile Radio Frequency Identification (RFID) system includes the following steps:

S1: establishing a dynamic tag arrival model for a mobile RFID system based on original modeling data and a grey model.

S2: improving initial values of the original modeling data through weighting;

S3: updating the data of the model based on a sliding window mechanism; and

S4: obtaining a tag arrival rate of the mobile RFID system based on updated data of the model.

Further, the establishing a dynamic tag arrival model for a mobile RFID system in step S1 specifically includes:

S11: establishing the tag arrival model for the mobile RFID system based on the original modeling data;

S12: denoting an original non-negative time series $X^0$ of a modeling length m as $X^0=\{x^0(1), x^0(2), \ldots x^0(i), \ldots, x^0(m)\}$, where $x^0(i)$ is an arrival rate of a frame Fi, and m is the modeling length, namely, a number of pieces of the original data used for prediction;

S13: accumulating the original series once to obtain a first-order accumulated series X' $X^1=\{x^1(1), x^1(2), \ldots x^1(j), \ldots, x^1(m)\}$, where $x^1(j)=\Sigma_{k=1}^{j} x^0(k)$, and a corresponding continuous time function is denoted as $x^1(t)$;

S14: fitting, based on the grey model, $$x^1(t) \text{ to } \frac{dx^1(t)}{dt} + ax^1(t) = b$$

using a first-order differential equation, where parameters a and b are undetermined parameters of the equation, a is referred to as a development coefficient, and b is referred to as a grey action quantity.

S15: discretizing the first-order differential equation in step S14 into $x^0(k)+ay^1(k)=b$ when t increments by 1, that is, $$x^1(t) - x^1(t-1) = \frac{\Delta x^1(t)}{\Delta t} = x^0(t),$$

where $$y^1(k) = \frac{x^1(k) + x^1(k-1)}{2},$$

k=2, 3, 4, ... m, and $Y^1=\{y^1(2), y^1(3), \ldots y^1(t), \ldots, y^1(m)\}$ is referred to as a background value sequence;

S16: solving the discretized first-order differential equation in step S15 to obtain $$\tilde{x}^1(k+1) = \left(x^1(1) - \frac{b}{a}\right)e^{-ak} + \frac{b}{a},$$

where $x^1(k+1)$ is a predicted value of a tag arrival rate corresponding to the first-order accumulated series at t=k+1, a and b are obtained by using the following least square method: $(a, b)^T=(P^T P)^{-1}P^T Q$, where P and Q are both matrices, $$P = \begin{pmatrix} -y^1(2) & 1 \\ -y^1(3) & 1 \\ \ldots & \ldots \\ -y^1(m) & 1 \end{pmatrix}, Q = \begin{pmatrix} x^0(2) \\ x^0(3) \\ \ldots \\ x^0(m) \end{pmatrix},$$

and T is a matrix transpose operation; and

S17: obtaining, based on a solution of the first-order differential equation and values of a and b, a predicted value $$\tilde{x}^0(k+1) = \tilde{x}(k+1) - \tilde{x}^1(k) = \left(x^1(1) - \frac{b}{a}\right)*e^{-ak}*(1-e^a)$$

of the original series through first-order decumulation, where $\tilde{x}^0(k+1)$ is the predicted value of the tag arrival rate when t=k+1, and k>=1.

Further, step S2 specifically includes: changing $x^1(1)$ in step S13 to $\tilde{x}^1(1)=\gamma_1 x^0(1)+\gamma_2 x^0(2)+ \ldots \gamma_m x^0(m)$ through weighting, where $\gamma_k=k/\Sigma_{j=1}^{m}$ m is a weighting coefficient, and $\Sigma_{k=1}^{m} \gamma_k=1$.

Further, the original series in step S17 is restored to obtain $$\tilde{x}^0(k+1) = \left(\gamma_1 x^0(1) + \gamma_2 x^0(2) + \ldots \gamma_m x^0(m) - \frac{b}{a}\right)*e^{-a_k}*(1-e^a).$$

Further, step S3 specifically includes: appending a tag arrival rate obtained after a reader finishes reading in a frame as a latest tag arrival rate to a latest piece of the modeling data, and deleting an oldest piece of the modeling data.

The beneficial effects of the present invention are: in the present-invention method for predicting the tag arrival rate of the mobile RFID system based on the improved grey model GM (1, 1) and the sliding window mechanism, weighting of an initial value of the differential equation of the grey model GM (1, 1) is improved to reduce the prediction error rate of the tag arrival rate of the mobile RFID system. In addition, the method for predicting the tag arrival rate of the mobile RFID system of the present invention features low calculation complexity and high system stability.

DETAILED DESCRIPTION

To enable a better understanding of the technical solutions of the present invention by those of ordinary skill in the prior art, the technical solutions of the present invention are further described below with reference to the accompanying drawings and embodiments.

In a static RFID system, a round R, a period that starts from a moment when a reader issues the first read command and ends after all tags in an identification zone are identified, consists of multiple frames Fi (i>=1), that is R={Fi|i⊆N}, where N is a natural number. Each frame Fi includes multiple slots tij, that is, Fi={ttj|j=1, 2, . . . Li}, where Li is a number of slots of a frame i, also referred to as a frame length of the frame i. A tag in the identification zone randomly selects a slot to wait for identification. After a frame elapses, the reader collects statistics on numbers of three types of slots: first, a successful slot in which a tag is successfully identified, second, a collision slot in which no tag is successfully identified because of tag collision, and an idle slot that is not selected by any tags. The reader sets a new identification frame length based on the numbers of the three types of slots and starts identification in a next frame. In the static RFID system, tags do not move, and no new tag enters the identification zone during identification. Therefore, the concept of round R in the static RFID system does not apply to a dynamic RFID system. In the dynamic RFID system, the concept of frame Fi is the same as the static RFID system, but during the identification process in the frame Fi, a new tag enters the identification zone. The following assumption is used: A tag arriving within the Fi frame can only be read in a next frame rather than this frame. A tag arrival rate of a frame i is unknown, and therefore a number of tags arriving in the frame cannot be foreseen. Consequently, a number of tags to be identified in a next frame are unknown, and a frame length of the next frame cannot be accurately set.

A method for predicting a tag arrival rate of a mobile RFID system provided in the present invention specifically includes the following steps.

S1: Establish a dynamic tag arrival model for a mobile RFID system based on original modeling data and a grey model.

Specifically, the method included the following steps.

S11: Establish a tag arrival model for the mobile RFID system based on the original modeling data; as shown in FIG. 1.

Figures 1, 2:
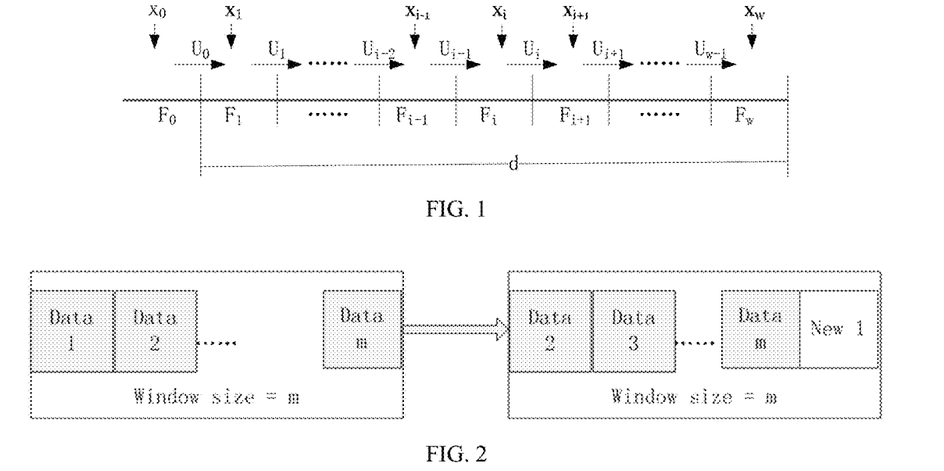
FIG. 1 is a tag arrival rate model for a mobile RFID system according to the present invention.
FIG. 2 is a schematic diagram of a sliding window mechanism according to the present invention.

In FIG. 1, Fi represents a frame i in an identification process, and Xi represents a tag arrival rate of the frame i. Ui is a number of to-be-identified tags transferred from the frame i to a frame i+1. W is a total number of frames that can be accommodated in an identification zone. $F_0$ is a preliminary frame in which a reader does not identify any tags. All tags that arrive in the frame $F_0$ are transferred to a frame $F_1$ for identification. Therefore, $U_0=x_0*L_0$, where $L_0$ represents a frame length of the frame $F_0$. After the preliminary frame, each Ui (i>=1) includes two parts: one is a number Ci of tags that are not identified in the frame i due to collision, and the other is a number Xi*Li of tags arrived in the frame i, that is, $U_i=C_i+x_i*L_i$.

S12: Denote an original non-negative time series $X^0$ of a modeling length m as $X^0=\{x^0(1), x^0(2), \ldots x^0(i), \ldots, x^0(m)\}$, where $x^0(i)$ is an arrival rate of a frame Fi, and m is the modeling length, namely, a number of pieces of the original data used for prediction.

S13: Accumulate the original series once to obtain a first-order accumulated series $X^1$ so as to smooth randomness of a random sequence, $X^1=\{x^1(1), x^1(2), \ldots x^1(j), \ldots, x^1(m)\}$, where $x^1(j)=\Sigma_{k=1}^{j} x^0(k)$, and a corresponding continuous time function is denoted as $x^1(t)$.

S14: Fit, based on the grey model, $$x^1(t) \text{ to } \frac{dx^1(t)}{dt} + ax^1(t) = b$$

using a first-order differential equation, where parameters a and b are undetermined parameters of the equation, a is referred to as a development coefficient, and b is referred to as a grey action quantity.

S15: Discretize the first-order differential equation in step S14 into $x^0(k)+ay^1(k)=b$ when t increments by 1, that is, $$x^1(t) - x^1(t-1) = \frac{\Delta x^1(t)}{\Delta t} = x^0(t),$$

where $$y^1(k) = \frac{x^1(k) + x^1(k-1)}{2},$$

k=2, 3, 4, . . . m, and $Y^1=\{y^1(2), y^1(3), \ldots y^1(t), \ldots, y^1(m)\}$ is a background value sequence. A common background value sequence is a median sequence.

S16: Solve the discretized first-order differential equation in step S15 to obtain $$\tilde{x}^1(k+1) = \left(x^1(1) - \frac{b}{a}\right)e^{-ak} + \frac{b}{a},$$

where $x^1(k+1)$ is a predicted value of a tag arrival rate corresponding to the first-order accumulated series at t=k+1, a and b are obtained by using the following least square method, $(a, b)^T=(P^T P)^{-1}P^T Q$, P and Q are both matrices, $$P = \begin{pmatrix} -y^1(2) & 1 \\ -y^1(3) & 1 \\ \ldots & \ldots \\ -y^1(m) & 1 \end{pmatrix}, Q = \begin{pmatrix} x^0(2) \\ x^0(3) \\ \ldots \\ x^0(m) \end{pmatrix},$$

and T is a matrix transpose operation.

S17: Obtain, based on a solution of the first-order differential equation and values of a and b, a predicted value $$\tilde{x}^0(k+1) = \tilde{x}^1(k+1) - \tilde{x}^1(k) = \left(x^1(1) - \frac{b}{a}\right) * e^{-ak} * (1 - e^a)$$

of the original series through first-order decumulation, where $\tilde{x}^0(k+1)$ is the predicted value of the tag arrival rate when $t=k+1$, and $k>=1$.

S2: Improve initial values of the original modeling data through weighting.

Specifically, $x^1(1)$ in step S13 is changed to $\tilde{x}^1 = \gamma_1 x^0(1) + \gamma_2 x^0(2) + \ldots \gamma_m x^0(m)$, through weighting, where $\gamma_k = k/\Sigma_{j=1}^m$ m is a weighting coefficient, and $\Sigma_{k=1}^m \gamma_k = 1$. The original series is restored in step S17 to obtain $$\tilde{x}^0(k+1) = \left(\gamma_1 x^0(1) + \gamma_2 x^0(2) + \ldots \gamma_m x^0(m) - \frac{b}{a}\right) * e^{-ak} * (1 - e^a),$$

where $\tilde{x}^0(k+1)$ is a final predicted value of the tag arrival rate.

The main reason for doing so is that the predicted value is generated based on $x^0(m)$, and therefore the predicated value is greatly affected by $x^0(m)$ but minimally affected by oldest data $x^0(1)$. As a result, in weight allocation, greater impact indicates a larger weight.

Step S3: After the tag arrival rate is predicated using the grey model, the RFID reader uses this predicted value to set a frame length and performs a next reading cycle. After tags are read in one frame, the reader can re-estimate the tag arrival rate based on an obtained slot status and corresponding value. Therefore, this predicted value should be appended as a latest tag arrival rate to a latest piece of the modeling data, and an oldest piece of the modeling data should be deleted.

This process is like a window sliding with an identification process, and a size of the window is the modeling length. After the reader completes reading in one frame, the window moves forward, as shown in FIG. 2.

Specifically, when modeling data of a prediction series is $x^0(i), x^0(i+1), \ldots x^0(i+m-1), \tilde{x}^0(i+m)$ is obtained through one prediction, and a data set used for next prediction is $\{x^0(i+1), \ldots x^0(i+m)\}$.

Step S4: Obtain a value $\tilde{x}^0(k+1)$, namely, the tag arrival rate of the mobile RFID system tag, of the restored original series based on updated model data.

The above is the method WMGSW (1, 1) for predicting the tag arrival rate of the mobile RFID system of the present invention. In this method, the following mechanisms are used: the weighted grey model with a modeling length of four and the sliding window mechanism. This prediction method is implemented as shown in FIG. 3.

Figure 3:
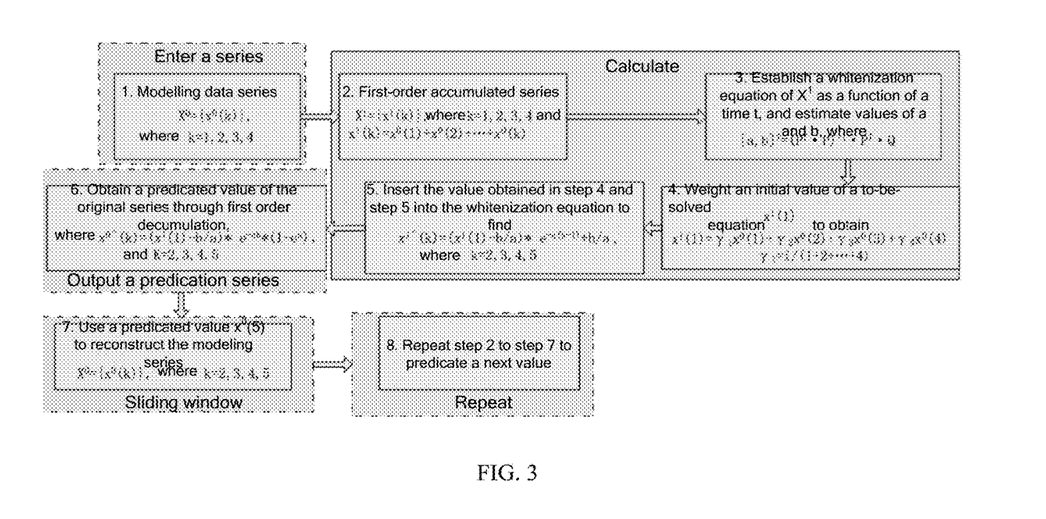
FIG. 3 is a flowchart of a method for predicting a tag arrival rate of a mobile RFID system according to the present invention.

It can be seen from FIG. 3 that the method for predicting the tag arrival rate of the mobile RFID system of the present invention including the following steps: inputting an original data series $X^0 = \{x^0(k)\}$, where $k=1, 2, 3, 4$;

obtaining a first-order accumulated series $X^1 = \{x^1(k)\}$ through a cumulative generation algorithm, where $k=1, 2, 3, 4$, and $x^1(k) = x^0(1) + x^0(2) + \ldots + x^0(k)$;

performing discretization and obtaining a and b, where $(a, b)^T = (P^T P)^{-1} P^T Q$;

weighting an initial value of a to-be-solved equation $x^1(1)$ to obtain $\tilde{x}^1(1) = \gamma_1 x^0(1) + \gamma_2 x^0(2) + \gamma_3 x^0(3) + \gamma_4 x^0(4)$;

obtaining, by using the weighted $x^1(1)$, a solution $$\tilde{x}^1(k) = \left(x^1(1) - \frac{b}{a}\right) * e^{-a(k-1)} + \frac{b}{a}$$

of a first-order grey differential equation with a single variable, where $k=2, 3, 4, 5$;

restoring the original series through a first-order decumulative algorithm to obtain $$\tilde{x}^0(k) = \left(x^1(1) - \frac{b}{a}\right) * e^{-a(k-1)} * (1 - e^a),$$

namely, a prediction result of a tag arrival rate of a mobile RFID system, where $k=2, 3, 4, 5$;

removing $x^0(1)$ from the original data series, and using the predicted value $x^0(5)$ as a last value of the data series, to reconstruct the model series $X^0 = \{x^0(k)\}$, where $k=2, 3, 4, 5$; and repeating the above calculation steps to obtain a predicted value of a next tag arrival rate.

Figure 4:
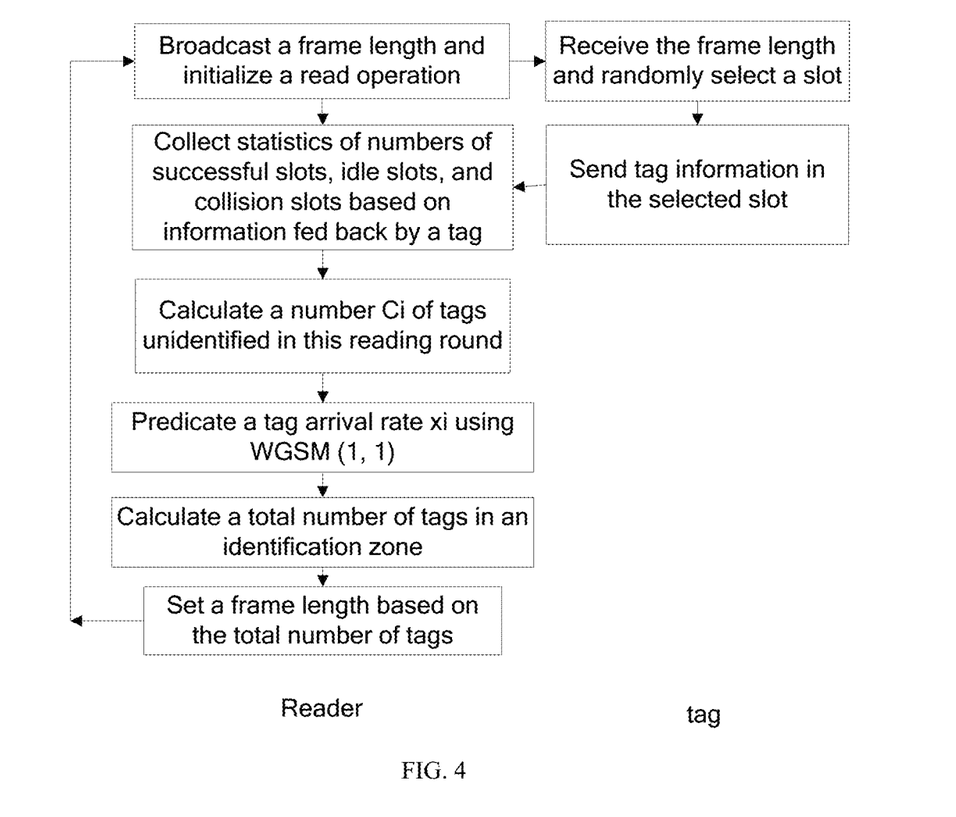
FIG. 4 is a schematic diagram of a reader-tag interaction process of a method for predicting a tag arrival rate of a mobile RFID system according to the present invention.

Further, in the method for predicting the tag arrival rate of the mobile RFID system of the present invention, a reader performs prediction calculation, and a tag receives only a signal from the reader and responds to the reader in a specific slot. FIG. 4 shows a specific reader-tag interaction process.

It can be seen from FIG. 4 that the specific reader-tag interaction process in the present invention is as follows: First, the reader broadcasts a reading parameter, and initiates a reading round. After receiving the broadcast parameter from the reader, the tag randomly selects a slot for data transmission. After completing a round of identification, the reader counts numbers of successful slots, idle slots, and collision slots, and calculates a number of collision tags based on the statistic result. The reader uses the prediction method in the present invention to predict a tag arrival rate and calculate a total number of tags participating in a next reading round. The reader sets a parameter based on the total number of tags, and broadcasts the parameter to start a new round of reading. This process repeats.

Further, to verify feasibility of the method for predicting the tag arrival rate of the mobile RFID system of the present invention, the following examples are carried out.

Example 1

A single-peak Gaussian distribution is used to simulate the method for predicting the tag arrival rate of the mobile RFID system of the present invention, that is, a normal distribution function denotes the tag arrival rate, namely, $x(t) \sim N(\mu, \sigma)$, where $\mu$ represents a mean value and $\sigma$ represents a variance.

A class ratio of data is calculated before prediction, to ensure that the data can be used in WGMSW (1, 1) for predication. The class ratio of the data is defined as $$\rho_i = \frac{x(i)}{x(i+1)}.$$

According to application criteria of GM (1, 1), $\rho_i$ should fall within $$\left[e^{\frac{-2}{m+1}}, e^{\frac{2}{m+1}}\right],$$

where m is a modeling length. If the system sets the modeling length to 4, $\rho_i$ should fall within $$\left[e^{\frac{-2}{5}}, e^{\frac{2}{5}}\right].$$

If the criteria cannot be met, pre-processing needs to be performed before prediction, to make the class ratio fall within the required interval.

Figure 5:
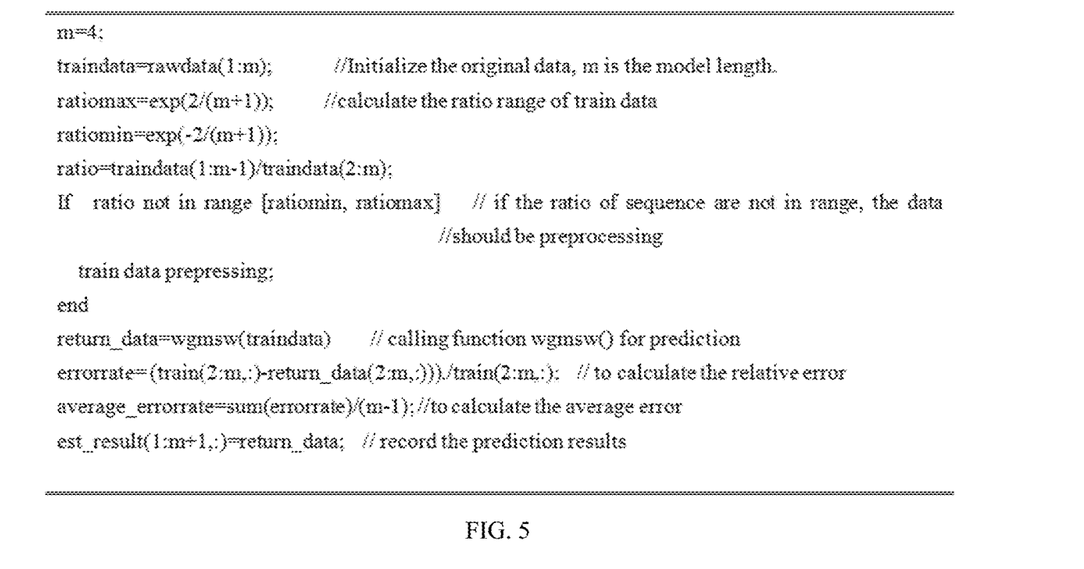
FIG. 5 is a screenshot of simulation pseudo code of a method for predicting a tag arrival rate of a mobile RFID system according to the present invention.

Pseudo code of WGMSW (1, 1) is shown in FIG. 5.

In the pseudo code of FIG. 5, wgmsw(parameters) is a custom function constructed using the algorithm in FIG. 3. In the function, the tag arrival rate is predicated by using a sliding window, and weighting and updating an initial value.

In a mobile RFID system, a reader can predicate, based on the obtained tag arrival rate, a next tag arrival rate by using the above pseudo code. This predicted value can be used to set a frame length of a next reading round.

Figure 6A:
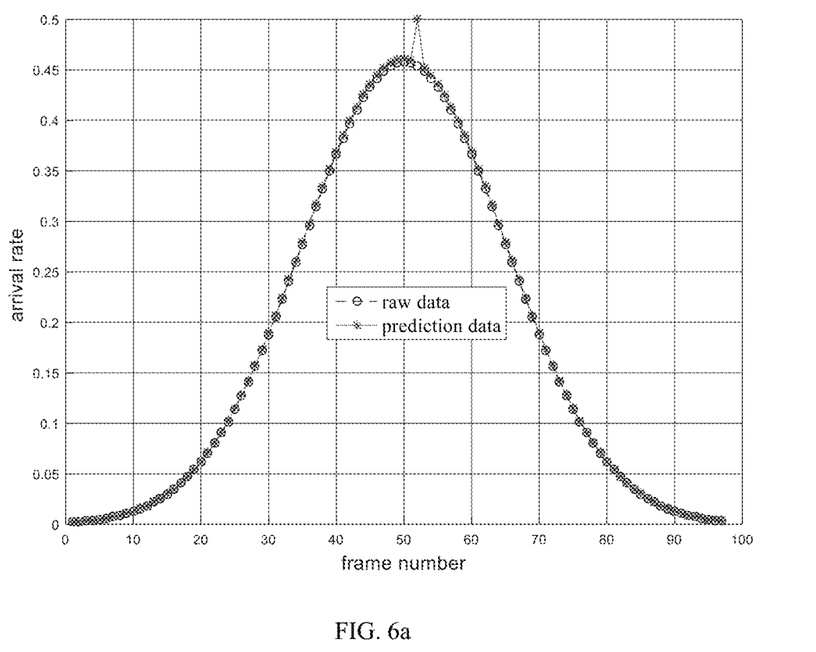
FIG. 6a is a graph of a simulation result for a normal distribution with a mean value of 50 and a variance of 15 in a traditional GM (1, 1) method according to Example 1 of the present invention.
Figure 6B:
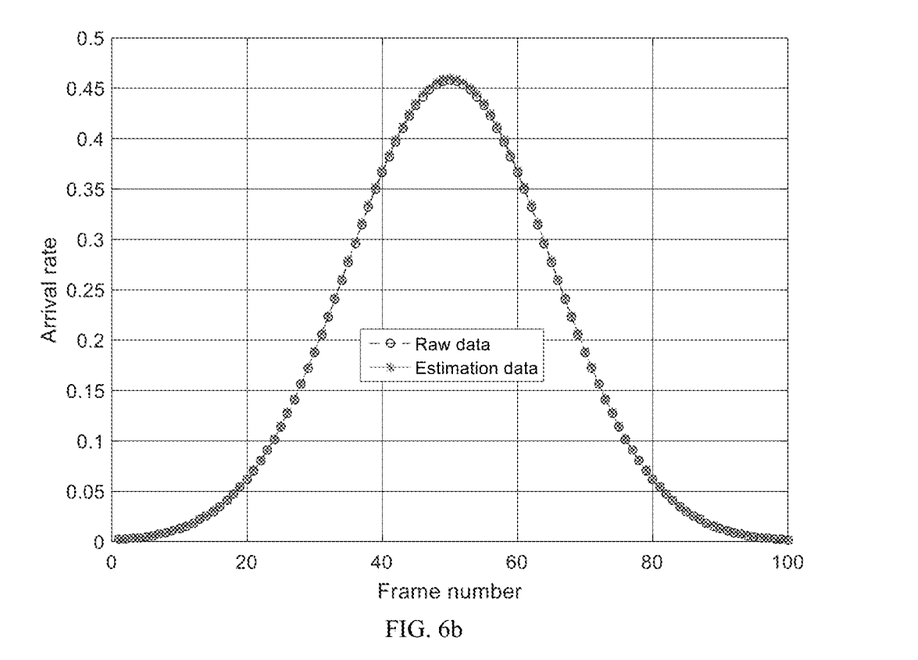
FIG. 6b is a graph of a simulation result for a normal distribution with a mean value of 50 and a variance of 15 in a WGMSW (1, 1) method according to Example 1 of the present invention.
Figure 6C:
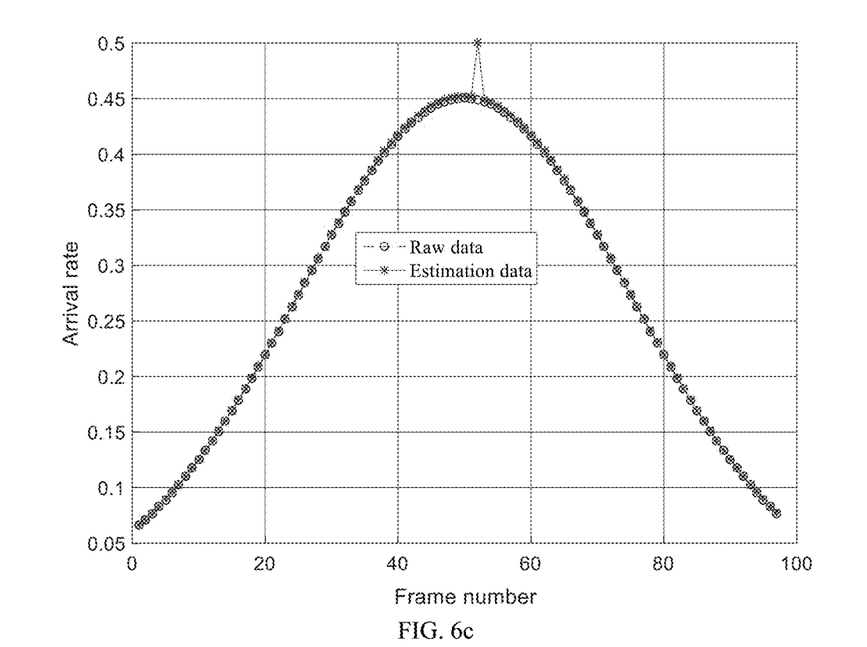
FIG. 6c is a graph of a simulation result for a normal distribution with a mean value of 50 and a variance of 25 in a traditional GM (1, 1) method according to Example 1 of the present invention.
Figure 6D:
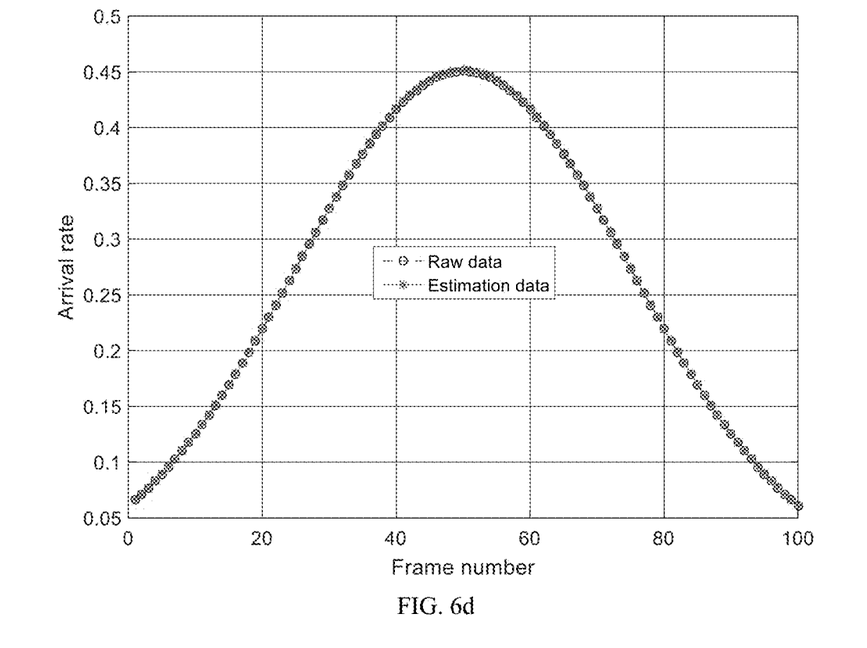
FIG. 6d is a graph of a simulation result for a normal distribution with a mean value of 50 and a variance of 25 in a WGMSW (1, 1) method according to Example 1 of the present invention.

A simulation hardware platform is as follows:
CPU: Intel® Core™ i5-4590 CPU @ 3.3 GHz
RAM: 8 GB
A simulation software platform is as follows:
Operating system: Windows 7
Application software: Matlab 2015b To measure performance of WGMSW (1, 1), a normal distribution with a same mean value µ but different variances σ is used in the present invention, and 100 pieces of data are sampled for simulation. With the sliding window mechanism, the algorithm can be run for 96 times to predict a tag arrival rate of a frame 5 to a frame 100. FIG. 6a to FIG. 6d show obtained simulation results of the normal distribution with the mean value of 50 and the variances of 15 and 25, respectively The blue line in the figure represents an actual tag arrival rate, and the red line represents a predicted tag arrival rate. FIG. 6a and FIG. 6c show a simulation analysis result of the traditional GM (1,1) method, and FIG. 6b and FIG. 6d show a simulation result of WMGSW (1,1).

For a tag arrival rate of a frame 52 in FIG. 6a (refer to FIG. 6a in substantial references), an actual value is 0.4535, but a predicted value is 0.5. This error is much larger than prediction errors of other data. The same phenomenon also occurs in FIG. 6c (refer to FIG. 6c in substantial references). In FIG. 6b (refer to FIG. 6b in substantial references) and FIG. 6d (refer to FIG. 6d in substantial references), there is no error mutation. Therefore, WGMSW(1,1) has better stability than the traditional GM(1,1) algorithm.

Further, a relative error method is used to measure a difference between a prediction series $\tilde{X}^0$ and an original series $X^0$. A residual thereof is denoted as $E=X^0-\hat{X}^0=[e(1), e(2), \ldots, e(n)]$, a relative error is $$relerror = \frac{e(k)}{x^0(k)} * 100\%,$$

and an average relative error is $$meanerror = \frac{1}{n}\sum_{i=1}^{n}|relerror(i)|.$$

Table 1 lists average prediction error rates of GM (1, 1) and WGMSW (1, 1).

TABLE 1

Average predication error table

| Algorithm | Average estimation error rate ε |
| --- | --- |
| GM(1, 1) with µ = 50, σ = 15 | 0.0071 |
| WGMSW (1, 1) with µ = 50, σ = 15 | 0.0055 |
| GM(1, 1) with µ = 50, σ = 25 | 0.0036 |
| WGMSW (1, 1) with µ = 50, σ = 25 | 0.0019 |

It can be seen from Table 1 that the prediction error rate of WGMSW(1,1) is lower than that of GM(1,1). Compared with a smaller σ, a larger σ means a slower change in the tag arrival rate and better tracking performance of predication.

Example 2

To compare with research results of other researchers, we choose the DSA-RMGM prediction method mentioned in the comparison document Dynamic Self-adaptive Gray Prediction Algorithm for RFID Tag Arrival Rate, and the data thereof. Table 2 lists the comparison results.

TABLE 2

Data comparison between WGMSW (1, 1) and DSA-RMGM prediction methods

| Frame number | Measurement value | Predicated value with DSA-RMGM when L = 4 | Predication error rate with DSA-RMGM when L = 4 | Predicated value with DSA-RMGM when L = 12 | Predication error rate with DSA-RMGM when L = 12 | Predicated value with WGMSW (1, 1) | Predication error rate with WGMSW (1, 1) |
| --- | --- | --- | --- | --- | --- | --- | --- |
| 40 | 0.46 | 0.6371 | 0.385 | 0.3879 | | | |
| 41 | 0.47 | 0.5899 | 0.2551 | 0.478 | 0.0170 | 0.4505 | 0.0415 |
| 42 | 0.42 | 0.5089 | 0.2117 | 0.622 | 0.4810 | 0.405 | 0.0357 |
| 43 | 0.38 | 0.4122 | 0.0847 | 0.6248 | 0.6442 | 0.364 | 0.0421 |
| 44 | 0.37 | 0.3405 | 0.0797 | 0.5802 | 0.5681 | 0.3272 | 0.1157 |
| 45 | 0.2 | 0.3419 | 0.7095 | 0.5267 | 1.6335 | 0.3482 | 0.7410 |

TABLE 2-continued

Data comparison between WGMSW (1, 1) and DSA-RMGM prediction methods

| Frame number | Measurement value | Predicated value with DSA-RMGM when L = 4 | Predication error rate with DSA-RMGM when L = 4 | Predicated value with DSA-RMGM when L = 12 | Predication error rate with DSA-RMGM when L = 12 | Predicated value with WGMSW (1, 1) | Predication error rate with WGMSW (1, 1) |
|---|---|---|---|---|---|---|---|
| 46 | 0.26 | 0.1839 | 0.2927 | 0.4079 | 0.5688 | 0.1678 | 0.3546 |
| 47 | 0.19 | 0.3545 | 0.8658 | 0.1711 | 0.0995 | 0.1633 | 0.1405 |
| Average predication error rate | | | 0.3570 | | 0.5732 | | 0.2102 |

It can be seen from Table 2 that an average prediction error rate is obtained by averaging prediction errors of a frame 41 to a frame 47. This value is slightly different from the data in Document [20], but this does not affect our conclusion. It can be learned from the results that the proposed WGMSW (1, 1) has a lower prediction error rate than the method mentioned in Dynamic Self-adaptive Gray Prediction Algorithm for RFID Tag Arrival Rate. Moreover, the modeling length of WGMSW (1, 1) is a fixed value of 4, and therefore the system has better stability.

The basic principles, main features, and advantages of the present invention are shown and described above. It should be understood by those skilled in the art that, the present invention is not limited by the aforementioned examples. The aforementioned examples and the description only illustrate the principle of the present invention. Various changes and modifications may be made to the present invention without departing from the spirit and scope of the present invention. Such changes and modifications all fall within the claimed scope of the present invention. The protection scope of the present invention is defined by the appended claims and their equivalents.

What is claimed is:

1. A method for predicting a tag arrival rate of a mobile Radio Frequency Identification (RFID) system, comprising the following steps:

S1: establishing a dynamic tag arrival model for a mobile RFID system based on original modeling data and a grey model, which comprises:

S11: establishing the tag arrival model for the mobile RFID system based on the original modeling data;

S12: denoting an original non-negative time series $X^0$ of a modeling length m as $X^0=\{x^0(1), x^0(2), \ldots, x^0(i), \ldots, x^0(m)\}$, wherein $x^0(i)$ is an arrival rate of a frame Fi, and m is the modeling length, namely, a number of pieces of the original data used for prediction;

S13: accumulating the original series once to obtain a first-order accumulated series $X^1$ $X^1=\{x^1(1), x^1(2), \ldots, x^i(j), \ldots, x^1(m)\}$ wherein $x^1(j)=\Sigma_{k=1}^{j}x^0(k)$, and a corresponding continuous time function is denoted as $x^1(t)$;

S14: fitting, based on the grey model, $$x^1(t) \text{ to } \frac{dx^1(t)}{dt} + ax^1(t) = b$$

using a first-order differential equation, wherein parameters a and b are undetermined parameters of the equation, a is referred to as a development coefficient, and b is referred to as a grey action quantity;

S15: discretizing the first-order differential equation in step S14 into $x^0(k)+ay^1(k)=b$ when t increments by 1, that is, $$x^1(t) - x^1(t-1) = \frac{\Delta x^1(t)}{\Delta t} = x^0(t),$$

wherein $$y^1(k) = \frac{x^1(k) + x^1(k-1)}{2},$$

k=2, 3, 4, . . . , m, and $Y^1=\{y^1(2), y^1(3), \ldots y^1(t) \ldots y^1(m)\}$ is referred to as a background value sequence;

S16: solving the discretized first-order differential equation in step S15 to obtain $$\tilde{x}^1(k+1) = \left(x^1(1) - \frac{b}{a}\right)e^{-ak} + \frac{b}{a},$$

wherein $\tilde{x}^1(k+1)$ is a predicted value of a tag arrival rate corresponding to the first-order accumulated series at t=k+1, a and b are obtained by using the following least square method: $(a, b)^T=(P^T P)^{-1} P^T Q$, wherein P and Q are both matrices, $$P = \begin{pmatrix} -y^1(2) & 1 \\ -y^1(3) & 1 \\ \cdots & \cdots \\ -y^1(m) & 1 \end{pmatrix}, \quad Q = \begin{pmatrix} x^0(2) \\ x^0(3) \\ \cdots \\ x^0(m) \end{pmatrix},$$

and T is a matrix transpose operation;

S17: obtaining, based on a solution of the first-order differential equation and values of a and b, a predicted value $$\tilde{x}^0(k+1) = \tilde{x}^1(k+1) - \tilde{x}^1(k) = \left(x^1(1) - \frac{b}{a}\right) * e^{-ak} * (1 - e^a)$$

of the original series through first-order decumulation, wherein $\tilde{x}^0(k+1)$ is the predicted value of the tag arrival rate when t=k+1 and k>=1;

S2: improving initial values of the original modeling data through weighting;

S3: updating the data of the model based on a sliding window mechanism; and

S4: obtaining a tag arrival rate of the mobile RFID system based on updated data of the model.

2. The method for predicting the tag arrival rate of the mobile RFID system according to claim 1, wherein step S2 specifically comprises: changing $x^1(1)$ in step S13 to $\tilde{x}^1(1)=\gamma_1 x^0(1)+\gamma_2 x^0(2)+ \ldots \gamma_m x^0(m)$ through weighting, wherein $\gamma_k = k/\Sigma_{j=1}^{m}$ a weighting coefficient, and $\Sigma_{k=1}^{m}\gamma_k=1$.

3. The method for predicting the tag arrival rate of the mobile RFID system according to claim 2, wherein the original series in step S17 is restored to obtain $$\tilde{x}^0(k+1) = \left(\gamma_1 x^0(1) + \gamma_2 x^0(2) + \ldots \gamma_m x^0(m) - \frac{b}{a}\right) * e^{-a_k} * (1 - e^a).$$

4. The method for predicting the tag arrival rate of the mobile RFID system according to claim 3, wherein step S3 specifically comprises: appending a tag arrival rate obtained after a reader finishes reading in a frame as a latest tag arrival rate to a latest piece of the modeling data, and deleting an oldest piece of the modeling data.

\* \* \* \* \*